(12) United States Patent
Zappaterra et al.

(10) Patent No.: US 10,116,771 B2
(45) Date of Patent: Oct. 30, 2018

(54) DATA TRANSMISSION VIA FRAME RECONFIGURATION

(71) Applicant: Sprint Spectrum LP, Overland Park, KS (US)

(72) Inventors: Luca Zappaterra, Eindhoven (NL); Muhammad Ahsan Naim, Ashburn, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 129 days.

(21) Appl. No.: 15/252,431

(22) Filed: Aug. 31, 2016

(65) Prior Publication Data

US 2018/0063833 A1    Mar. 1, 2018

(51) Int. Cl.
| | |
|---|---|
| *H04L 12/26* | (2006.01) |
| *H04L 29/06* | (2006.01) |
| *H04L 5/00* | (2006.01) |
| H04W 92/20 | (2009.01) |
| H04W 92/02 | (2009.01) |

(52) U.S. Cl.
CPC ........... *H04L 69/08* (2013.01); *H04L 5/00* (2013.01); *H04W 92/02* (2013.01); *H04W 92/20* (2013.01)

(58) Field of Classification Search
CPC .............. H04L 5/0053; H04L 72/0426
See application file for complete search history.

(56) References Cited

U.S. PATENT DOCUMENTS

| | | | | |
|---|---|---|---|---|
| 2005/0250506 | A1* | 11/2005 | Beale ................ | H04L 5/0037 455/452.1 |
| 2007/0121735 | A1* | 5/2007 | Kim .................. | H04L 27/00 375/259 |
| 2007/0160161 | A1* | 7/2007 | Murakami .......... | H04L 1/0618 375/267 |
| 2011/0310747 | A1* | 12/2011 | Seo ................... | H04B 7/2606 370/246 |
| 2013/0083736 | A1* | 4/2013 | Yin .................... | H04W 72/0446 370/329 |
| 2014/0334354 | A1 | 11/2014 | Sartori et al. | |
| 2015/0043396 | A1 | 2/2015 | Ekpenyong | |
| 2015/0250017 | A1* | 9/2015 | Ingale ................ | H04B 7/2615 370/280 |
| 2016/0183232 | A1* | 6/2016 | Stirling-Gallacher ...................... H04W 72/1226 370/280 |

* cited by examiner

*Primary Examiner* — Kevin C. Harper

(57) ABSTRACT

Transmitting data via frame reconfiguration comprises encoding, at a source node, the data into a plurality of frame configurations, each of the plurality of frame configurations comprising a sequence of uplink and downlink subframes, and communicating, via an antenna of the source node, using the plurality of frame configurations, wherein a target node is configured to identify the plurality of frame configurations and decode the data.

18 Claims, 6 Drawing Sheets

DATA TRANSMISSION VIA FRAME RECONFIGURATION

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. However, there may be other types of access nodes within a coverage area of the one or more access nodes, such as small access nodes, Wi-Fi routers, or other types of wireless access points having their own communication networks and wireless devices connected thereto. Direct communication between different types of access nodes, particularly those on different networks, is often limited and generally requires complex protocols, interfaces, and setup of various communication paths through other wide-area networks such as the internet, cloud, etc.

OVERVIEW

Exemplary embodiments described herein include systems, methods, and processing nodes for wireless data transmission from a source node using frame reconfiguration. An exemplary method for data transmission via frame reconfiguration includes encoding, at a source node, the data into a plurality of frame configurations. Each of the plurality of frame configurations comprises a sequence of uplink and downlink subframes. The method further comprises communicating, to a target node, using the plurality of frame configurations. The target node is configured to identify the plurality of frame configurations and decode the data.

An exemplary system for data transmission via frame reconfiguration includes a source node and a target node located within a wireless coverage area of the source node. The source node is configured to encode a data string into a pattern of frame configurations, and initiate a communication using the pattern of frame configurations. The target node is configured to identify the pattern of frame configurations in the communication, and decode the data from the pattern of frame configurations.

An exemplary processing node for receiving data encoded in a pattern of frame configurations is configured to perform operations including monitoring a wireless transmission by a source access node, detecting a pattern of frame configurations in the wireless transmission, and decoding data encoded in the pattern of frame configurations. The pattern of frame configurations comprises a plurality of frame configurations, each of the plurality of frame configurations comprising a sequence of uplink and downlink subframes.

DETAILED DESCRIPTION

Figure 1:
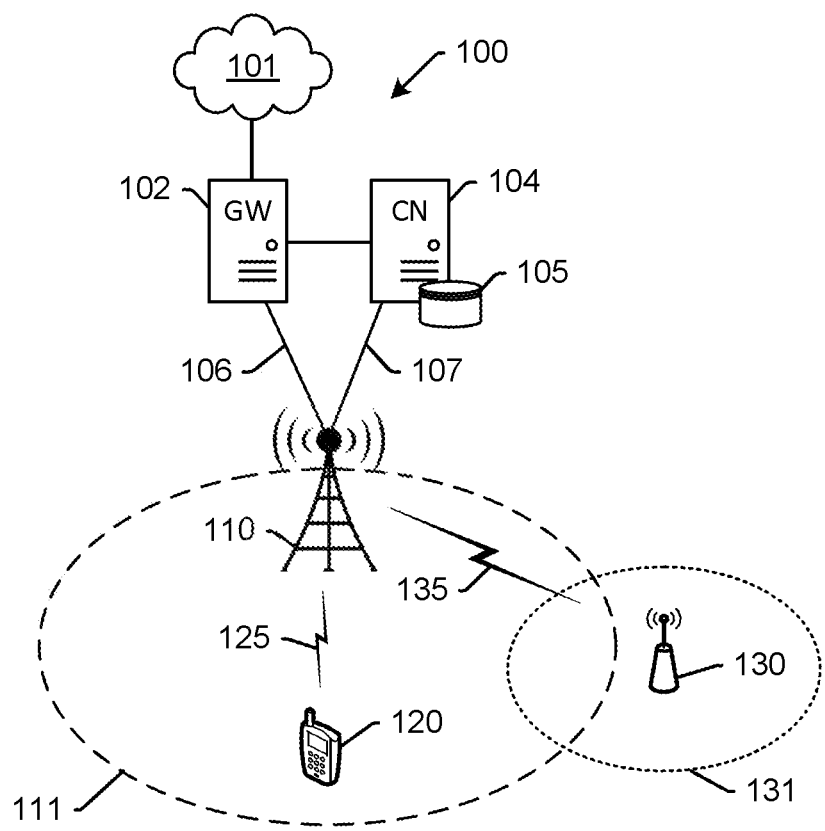
FIG. 1 depicts an exemplary system for data transmission using frame reconfiguration.

In embodiments disclosed herein, a source access node coupled to a first wireless network can transmit any data wirelessly to a target wireless device. The target wireless device can be any device that operates using the same frequency or a different frequency than the source access node. The target wireless device can be another access node coupled to a second wireless network. The source access node (or plurality of access nodes on the first wireless network) is configured to encode the data (or portions thereof) as a plurality of frame configurations arranged in a specific order, i.e. a pattern of frame configurations. Each frame configuration comprises a sequence of subframes, each subframe in the sequence being dedicated to either uplink, downlink, or special transmission for a specified period of time. For example, if the source access node is a time division duplex (TDD) access node in a long-term evolution (LTE) system, a data frame is about 10 ms in duration and comprises 10 subframes, each of which is about 1 ms in duration. In such a system, a source access node can select from a number of different frame configurations each comprising a different sequence of subframes. To encode the data desired to be transmitted, different frame configurations may be selected in a particular order or pattern. The length of the pattern can be dynamic or fixed. For example, a pattern of a fixed length may be used for portions of the data. The source access node then implements the pattern of frame configurations by, for instance, broadcasting each frame configuration in the selected pattern across its coverage area, and communicating with wireless devices connected thereto using the pattern of frame configurations.

Moreover, the target wireless device is configured to monitor the frame configurations utilized by the source access node, determine the pattern of frame configurations, and decode the transmitted data. For instance, if the target wireless device is a Wi-Fi router or access point on a home network, the target wireless device may be further equipped with a transceiver that is able to detect the sequence of uplink and downlink subframes in each frame configuration of the pattern of frame configurations. The pattern may be determined by listening to a system information message broadcast by the source access node. For example, in an LTE system, the system information message may be a SIB message. The system information message may comprise identifiers of each pattern. Alternatively or in addition, the sequence of uplink and downlink frames may be detected by monitoring a waveform of the transmissions engaged in by the source access node. In either case, the target wireless device is able to identify or determine a pattern of frame configurations, and decode the transmitted data based on the known encoding performed by the source access node. For example, the pattern may comprise a primary or secondary synchronization signal, and start and end patterns, in addition to the data encoded by the source access node, as further described herein. Thus, the target wireless device can recognize the beginning of a frame, uplink and downlink subframes contained therein, and the encoded data.

Consequently, the embodiments disclosed herein enable wireless communication across different types of wireless networks without requiring specialized interfaces/adapters or additional network elements. The operations disclosed herein may be performed by one or more of a source access node, a target wireless device/node, a controller node, or any other network node, alone or in any combination. These and additional operations are further described with respect to the embodiments depicted in FIGS. 1-6 below.

FIG. 1 depicts an exemplary system 100 for data transmission using frame reconfiguration. System 100 comprises a communication network 101, gateway 102, controller node 104, access node 110, end-user wireless device 120, and target node 130. Access node 110 is illustrated as having a coverage area 111, with end-user wireless device 120 being located within coverage area 111 and accessing network services directly from access node 110 over a wireless communication link 125 on an air interface deployed by access node 110. Target node 130 is illustrated as having a coverage area 131 that partially overlaps with coverage area 111. Thus, and as further described below, target node 130 is able to communicate wirelessly with access node 110 via, for instance, air interface 135. It should be noted that although coverage area 131 is only partially overlapping coverage area 111, other embodiments are possible where coverage area 131 is entirely within coverage area 111, without any material difference to the operations described herein.

In operation, access node 110 (hereinafter, "source access node") can encode any data that is desired to be transmitted to target node 130, and transmit the data wirelessly to target node 130 by virtue of the overlapping coverage areas 111, 131. Source access node 110 can be configured to encode the data (or a portion thereof) into a pattern of frame configurations comprising at least two frame configurations. One or more data bits of the data intended to be transferred can be represented in different frame reconfigurations. For example, reconfiguring the frame configuration from one frame configuration selected from a list of available frame configurations to another frame configuration from the list can indicate a specific bit in a sequence of bits. Thus, a sequence of data bits can be represented in one or more patterns of frame configurations. Moreover, when source access node 110 implements the pattern of frame configurations by sequentially broadcasting the frame configurations and/or communicating with wireless device 120 using the pattern of frame configurations, target node 130 can monitor the air interface 135 or 125, determine the pattern of frame configurations using a system information signal or a waveform detection, and decode the transmitted data.

Access node 110 can be any network node configured to provide communication between end-user wireless device 120 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an exemplary embodiment, a macrocell access node can have a coverage area 111 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Target node 130 can be another access node like source access node 110, or can comprise any wireless access point, such as a Wi-Fi router. In one exemplary embodiment, target node 130 may be any wireless device that does not communicate with source access node 110 using standard communication protocols such as wireless device 120. For example, target node 130 can operate using a different frequency or band of frequencies than source access node 110, while being configured with the ability to "listen" or monitor the air interface of source access node 110. Moreover, it is noted that while access node 110 and target node 130 are illustrated in FIG. 1, any number of access nodes and target nodes can be implemented within system 100. See for example, FIG. 4 and associated description herein.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access nodes 110 may communicate with other access nodes (not shown) using a direct link such as an X2 link or similar.

Wireless device 120 may be any device, system, combination of devices, or other such communication platform capable of communicating wirelessly with access node 110 using one or more frequency bands deployed therefrom. Wireless device 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 120. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing encoding information, such as a mapping or relationship between data to be encoded and different frame configurations, as further described herein. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

As described herein, in a time division duplex (TDD) system, the system bandwidth is shared between uplink and downlink, with the sharing being performed by allotting different periods of time (e.g. transmission time intervals or TTIs) to uplink and downlink transmission. For example, a transmission frame (or simply "frame") of 10 ms in duration may comprise a number of subframes of 1 ms in duration (i.e., TTIs), arranged in a sequence of uplink subframes and downlink subframes. In some embodiments, a special subframe may also be used, for instance, as a guard between an uplink subframe and a downlink subframe or for any other suitable purpose. See, for example, exemplary frame configurations 212 and 213 depicted in FIG. 2. Each frame configuration 212, 213 comprises 10 subframes SF0-SF9, and each frame configuration 212, 213 comprises a different order of downlink (D), uplink (U), and special (S) subframes.

Other frame configurations may comprise various other sequences of special, downlink, and uplink subframes. When using a TDD frame structure, an uplink subframe and a downlink subframe may be transmitted over the same frequency at different times. Moreover, different frame configurations comprise different sequences of uplink subframes and/or downlink subframes. In some embodiments, for instance within an LTE TDD system, different frame configurations may be selected based on the number of uplink and downlink subframes therein, so as to meet load conditions of the air interface of an access node. See, for example, Table 1:

TABLE 1

Frame Configurations

| Frame Config. (FC1-FCn) | Subframe (SF0-SF9) | | | | | | | | | |
|---|---|---|---|---|---|---|---|---|---|---|
| | SF0 | SF1 | SF2 | SF3 | SF4 | SF5 | SF6 | SF7 | SF8 | SF9 |
| FC0 | D | S | U | U | U | D | S | U | U | U |
| FC1 | D | S | U | U | D | D | S | U | U | D |
| FC2 | D | S | U | D | D | D | S | U | D | D |
| FC3 | D | S | U | U | U | D | D | D | D | D |
| FC4 | D | S | U | U | D | D | D | D | D | D |
| FC5 | D | S | U | D | D | D | D | D | D | D |
| FC6 | D | S | U | U | U | D | S | U | U | D |
| ... | | | | | ... | | | | | |
| FCn | D | S | U | F | F | D | S/D | F | F | F |

Figure 2:
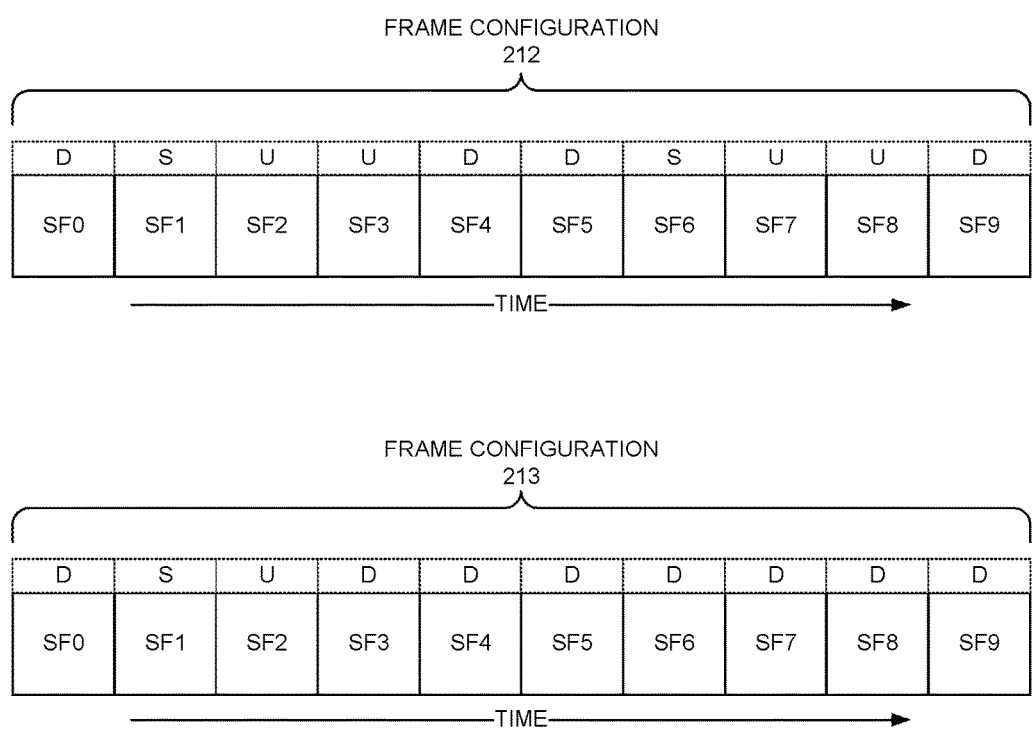
FIG. 2 depicts a table of exemplary LTE frame configurations.

It will be noted that frame configuration 212 in FIG. 2 corresponds to the identifier FC2 in Table 1, and frame configuration 213 corresponds to the identifier FC5. Further, LTE standards have prescribed seven known frame configurations (FC0-FC6 in Table 1) that can be selected from at any time by a network node, such as an access node or controller node. In other embodiments, such as in an enhanced interference mitigation and traffic adaptation (eIMTA) system within an LTE network, a frame configuration may comprise one or more flexible subframes that can be dynamically adjusted to either be downlink, uplink, or special subframes. See, for instance, configuration n with flexible subframes (F) in Table 1. For the purposes of the subject disclosure, a frame configuration is not limited to existing known frame configurations, but can be any sequence of uplink and downlink subframes that can be appreciated by those having ordinary skill in the art in light of this disclosure.

Figure 3:
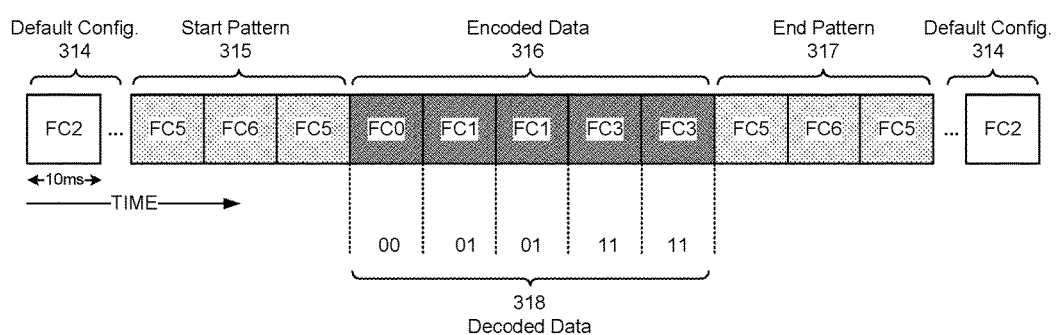
FIG. 3 depicts an exemplary pattern of frame configurations.

Moreover, exemplary embodiments described herein perform operations such as encoding data by arranging a plurality of frame configurations in a specific order, i.e. a pattern of frame configurations, and implementing the pattern of frame configurations in the air interface of one or more source access nodes. FIG. 3 depicts an exemplary pattern of frame configurations. The pattern comprises plurality of frame configurations (identifiable by frame configuration identifiers FC1 . . . FCn), including a start pattern 315, encoded data 316, and an end pattern 317. During implementation of the pattern, default configurations 314 are temporarily suspended. This suspension of default configurations (and subsequent default configurations/reconfigurations normally based on traffic management, etc.) is performed when there the air interface is not loaded. Thus, transmission of data using patterns of frame configurations does not impact regular transmission to and from other wireless devices.

Meanwhile, the pattern in FIG. 3 begins with the implementation of start pattern 315, and ends with an end pattern 317, subsequent to which default (or normal) configuration 314 is implemented. Both start pattern 315 and end pattern 317 utilize sequences of frame configurations that are not normally performed by a network and are therefore easily recognizable as triggers for data transmission. For example, the start pattern 315 of frame configurations FC5->FC-6->FC5 indicates reconfiguration from a downlink-heavy configuration to an uplink-heavy configuration, back to a downlink-heavy configuration (see Table 1). When the source access node is not attempting to transmit data to the target node, such a sequence of frame configurations may be impermissible or at least highly improbable, as there is typically no utility in drastically switching the uplink-downlink balance so rapidly. Consequently, when a listening target node detects such a pattern, the target node can then begin to parse the encoded data 316.

See also Table 2 below, depicting the subframe sequences for each frame configuration of the pattern depicted in FIG. 3:

TABLE 2

| Pattern of Frame Configurations | | | | | | | | | | |
|---|---|---|---|---|---|---|---|---|---|---|
| Configuration Pattern | Subframe (SF0-SF9) | | | | | | | | | |
| | SF0 | SF1 | SF2 | SF3 | SF4 | SF5 | SF6 | SF7 | SF8 | SF9 |
| FC5 | D | S | U | D | D | D | D | D | D | D |
| FC6 | D | S | U | U | U | D | S | U | U | D |
| FC5 | D | S | U | D | D | D | D | D | D | D |
| FC0 | D | S | U | U | U | D | S | U | U | U |
| FC1 | D | S | U | U | D | D | S | U | U | D |
| FC1 | D | S | U | U | D | D | S | U | U | D |
| FC3 | D | S | U | U | U | D | D | D | D | D |
| FC3 | D | S | U | U | U | D | D | D | D | D |
| FC5 | D | S | U | D | D | D | D | D | D | D |
| FC6 | D | S | U | U | U | D | S | U | U | D |
| FC5 | D | S | U | D | D | D | D | D | D | D |

In an exemplary embodiment, the data encoded within the frame configurations of encoded data 316 may be in the form of binary bits. The binary bits can represent any data that a source access node intends to transmit to a target node. For example, the information can be synchronization information related to, for example, time, date, etc., load information that may be useful for a target node to have in the case that the target node is used to offload wireless devices from the source access node, or any other information. The target node can parse the encoded data 316 to determine the binary bits represented in the pattern. The source and target nodes may use a commonly-known encoding mechanism, such as a mapping table that maps specific bits to specific frame configurations. In the depicted exemplary embodiment, FC0 may be mapped to 00, FC1 to 01, and FC3 to 11. Thus, decoded data 318 comprises the binary string 0001011111 or the sequence of binary strings 00-01-01-11-11, depending on the type of encoding used. Other means for encoding data may be used, and other types of data besides binary strings may be encoded into different frame configurations and reconfigurations thereof. Further, additional frame configurations, including flexible frame configurations, can be defined to allow for more bits to be conveyed. For example, eight frame configurations may be defined for encoding three bits of information per frame.

In either case, the target node continues to parse encoded data 316, until it detects an end pattern 317. End pattern 317 may be the same as start pattern 315, or a similarly predetermined sequence that is mapped to a command to end the transmission of data. Moreover, an end-pattern is not necessary for these operations to be performed—a length of the encoded data 316 may be known or indicated to the target node, such that upon parsing and determining the number or quantity of data, the target node simply stops monitoring, and the source access node resumes its default configuration 314. In some embodiments, if only one trigger (i.e. starting or ending sequence) is used, the number of frames succeeding (or preceding) encoded data 316 information can be known or previously-indicated to both source and target nodes.

Figure 4:
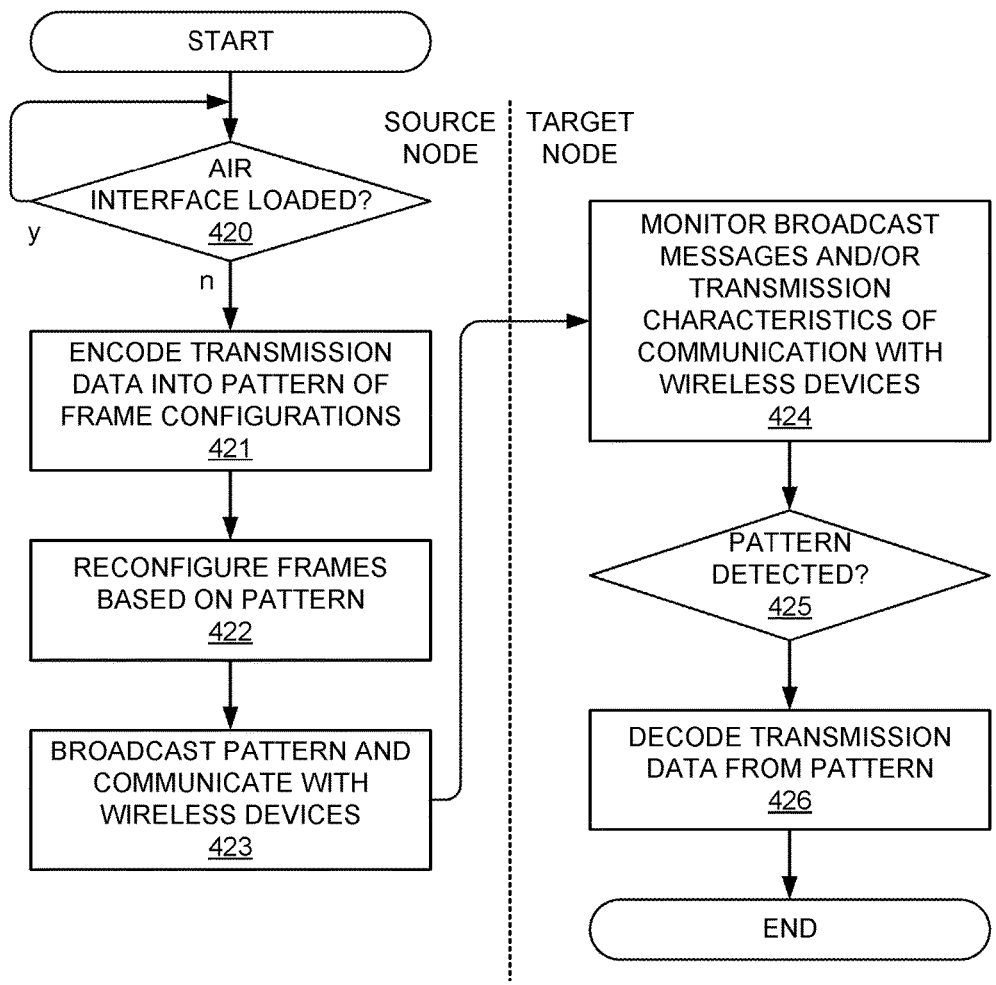
FIG. 4 depicts an exemplary method for data transmission from a source node to an access node using frame reconfiguration.
Figure 5:
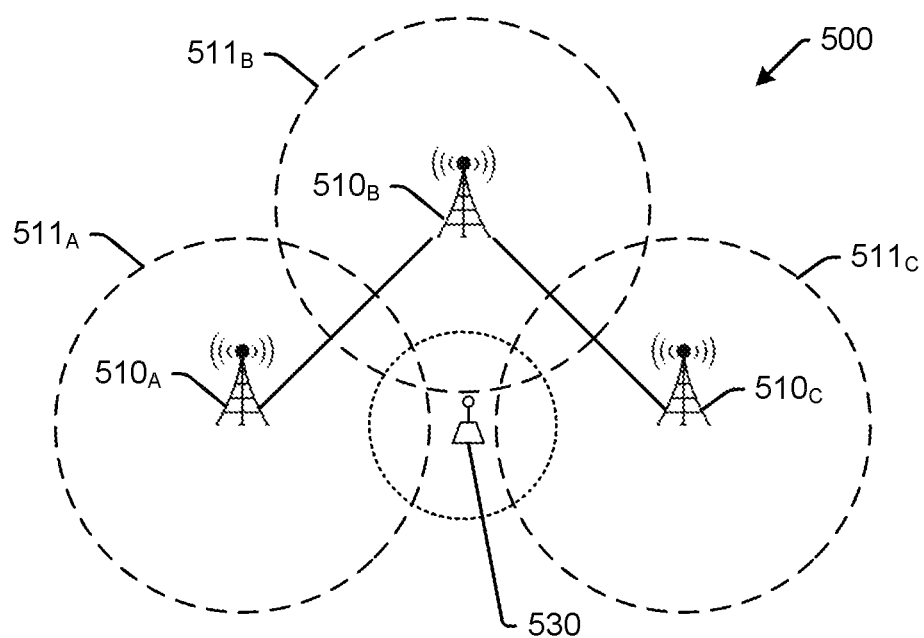
FIG. 5 depicts an exemplary system including a plurality of access nodes for data transmission using frame reconfiguration.

FIG. 4 depicts an exemplary method for data transmission from a source node to a target node using frame reconfiguration. The source node may be a currently-serving access node, a plurality of access nodes (as depicted in FIG. 5), or a controller node. The target node may be any target wireless device, including routers/devices attached to other wireless networks and within communication range of the source access node. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The exemplary method begins with a source access node performing a decision at 420 based on a load determination of the air interface of the source access node. Performing multiple frame reconfigurations for an air interface of an access node can affect the quality of service for wireless devices attached to the cell, sector, or band class deployed by the access node. Therefore, the disclosed data transmission via frame reconfiguration is performed only when the air interface is not loaded. For example, the load caused by wireless devices attached to the source access node may exceed a threshold load, upon which the air interface is determined to be loaded at 420. If the load is determined to be below the threshold load, i.e. if the air interface is not loaded, then the method is allowed to continue.

At 421, the data intended to be transmitted to the target node is encoded into a plurality of frame configurations arranged in a specific order, i.e. a pattern of frame configurations. As described herein, any encoding mechanism may be used that generally maps data bits or other units to particular frame configurations. The encoding may further include generating a pattern of frame configurations. At 422, the frames of the source access node are reconfigured based on the pattern. As described herein, each frame configuration comprises a sequence of uplink, downlink, and special subframes, and the encoding comprises determining a number of different frame configurations in a particular order or pattern. Thus, the reconfigured frame configurations can be implemented by the source access node. For example, at 423, the source access node broadcasts each frame configuration in the selected pattern across its coverage area, and communicates with wireless devices connected thereto using each frame configuration in the order defined by the pattern of frame configurations.

At 424, the target node monitors the air interface and transmission characteristics of the communications of the source access node, and detect whether or not a pattern of frame configurations is being broadcast or utilized at 425. For instance, the target node can be equipped with a transceiver that is able to tune in or "listen" to the frequencies used by the source access node, and to detect uplink and downlink subframes. A sequence of uplink and downlink subframes (and, therefore, a pattern of frame configurations) may be detected by monitoring a transmission characteristic, such as a waveform, of the transmissions engaged in by the source access node. Alternatively or in addition, the target node may listen to a system information message broadcast by the source access node, and to identify or determine a pattern of frame configurations therein. In either case, at 426, the transmitted data is decoded based on the known encoding performed by the source access node. For example, the pattern may comprise a primary or secondary synchronization signal, and start and end patterns, in addition to the data encoded by the source access node, as further described herein. Thus, the target node can recognize the beginning of a frame, uplink and downlink subframes contained therein, and the encoded data.

FIG. 5 depicts an exemplary system 500 comprising a plurality of access nodes for data transmission using frame reconfiguration. System 500 comprises source access nodes $510_A$, $510_B$, and $510_C$, and a target node 530 that is within a wireless range of coverage areas $511_A$, $511_B$, and $511_C$ associated respectively with source access nodes $510_A$, $510_B$, and $510_C$. Similar to FIG. 1, access nodes $510_A$, $510_B$, and $510_C$ can be any standard access node, such as macrocell access nodes, base transceiver stations, radio base stations, eNodeBs, or the like. Target node 530 can be any wireless device, access node, or wireless access point (such as, for example, a Wi-Fi router) that can operate using a different frequency or band of frequencies than source access nodes $510_A$, $510_B$, and $510_C$, while being configured with the ability to "listen" or monitor the air interface of source access nodes $510_A$, $510_B$, and $510_C$.

In operation, each of source access nodes $510_A$, $510_B$, and $510_C$ can be configured with enhanced Interference Mitigation & Traffic Adaptation (eIMTA), which allows for dynamic TDD frame reconfiguration to accommodate variations of traffic loads, as described above. To prevent interference among neighboring cells or access nodes, dynamic TDD frame reconfiguration can be performed in cell clusters. Therefore, all source access nodes $510_A$, $510_B$, and $510_C$ simultaneously perform frame reconfiguration operations, including transmission of data to target node 530 via implementing patterns of frame configurations. For example, source access nodes $510_A$, $510_B$, and $510_C$ can encode any data that is desired to be transmitted to target node 530 and transmit the data wirelessly to target node 530. Moreover, when source access nodes $510_A$, $510_B$, and $510_C$ implement the pattern of frame configurations by sequentially broadcasting the frame configurations and/or communicating with other devices using the pattern of frame configurations, target node 530 can monitor the air interface, determine the pattern of frame configurations using a system information signal or a waveform detection, and decode the transmitted data, as described herein.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100, 500 may be, comprise, or include computers systems and/or processing nodes. This includes, but is not limited to: access nodes 110, $510_A$, $510_B$, $510_C$, target nodes 130, 530, controller node 104, and/or network 101.

Figure 6:
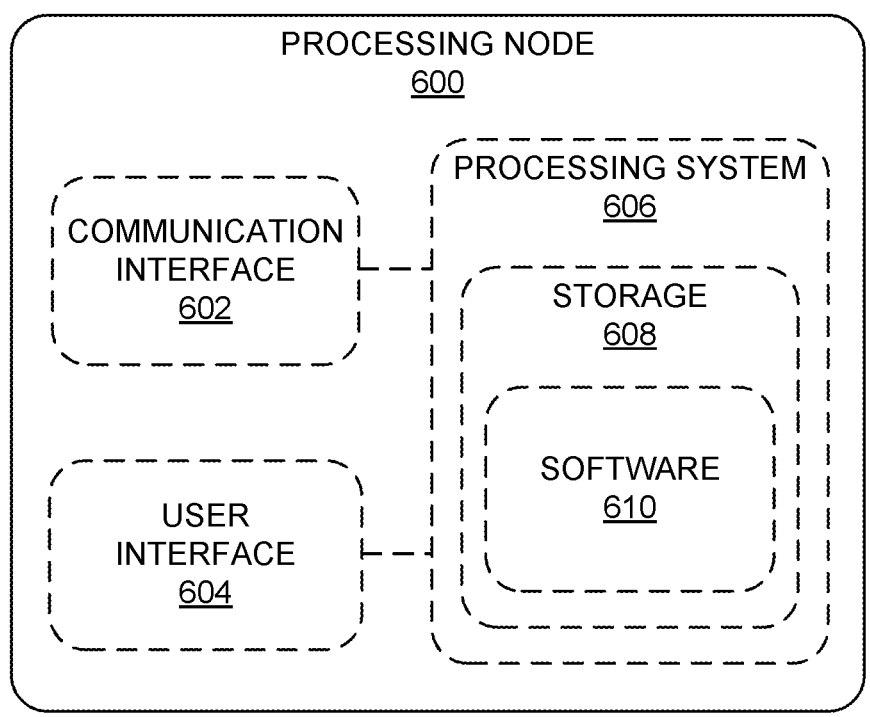
FIG. 6 depicts an exemplary processing node for data transmission using frame reconfiguration.

FIG. 6 depicts an exemplary processing node 600 for data transmission using frame reconfiguration. Processing node 600 comprises a communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a scheduler module. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for transmitting data via frame reconfiguration, the method comprising:
    mapping, by a source node, a plurality of data bits to a corresponding plurality of frame configurations, each of the plurality of frame configurations comprising a sequence of uplink and downlink subframes;
    generating, by the source node, a pattern of frame configurations based on a data string to be transmitted to a target node, the pattern comprising one or more frame configurations of the plurality of frame configurations corresponding to bits within the data string; and
    broadcasting, from the source node, the pattern of frame configurations,
    wherein the target node is configured to identify the pattern of frame configurations and decode the data string.

2. The method of claim 1, wherein the data string comprises a binary string.

3. The method of claim 1, wherein the pattern of frame configurations comprises a start pattern, and wherein the target node is configured to identify the start pattern prior to decoding the data string.

4. The method of claim 1, wherein the pattern of frame configurations further comprises an end pattern, and wherein the target node is configured to identify the end pattern prior to stopping decoding the data string.

5. The method of claim 1, wherein broadcasting the pattern of frame configurations comprises broadcasting an identifier of each of the plurality of frame configurations over a coverage area of the source node, and wherein the target node is configured to receive the broadcast.

6. The method of claim 1, wherein broadcasting the pattern of frame configurations comprises communicating with a wireless device over a wireless link using each frame configuration in the pattern of frame configurations, and wherein the target node is configured to detect a transmission characteristic of the wireless link.

7. The method of claim 6, wherein the transmission characteristic comprises a waveform.

8. The method of claim 1, further comprising determining that the source node is not loaded prior to performing the generating and broadcasting operations.

9. A system for transmitting data via frame reconfiguration, the system comprising:
    a source node configured to:
        map a plurality of data bits to a corresponding plurality of frame configurations;
        encode a data string comprising one or more of the plurality of bits as a pattern of frame configurations comprising one or more of the corresponding plurality of frame configurations; and
        initiate a communication using the pattern of frame configurations; and
    a target node configured to:
        identify the pattern of frame configurations in the communication; and decode the data string from the pattern of frame configurations;

wherein the target node is located within a wireless coverage area of the source node.

10. The system of claim 9, wherein source node comprises a first access node coupled to a first wireless network.

11. The system of claim 10, wherein the target node comprises one or more of a second access node coupled to a second wireless network, or a wireless device in communication with the second wireless network.

12. The system of claim 9, wherein the target node operates on a different frequency from the source node.

13. The system of claim 12, wherein the target node comprises a transceiver configured to operate on the same frequency as the source node.

14. The system of claim 9, wherein the source node is one among a plurality of communicatively coupled source nodes.

15. The system of claim 14, wherein each of the plurality of communicatively coupled source nodes is configured to simultaneously initiate communication using the pattern of frame configurations.

16. A processing node for receiving data encoded in a pattern of frame configurations, the processing node being configured to perform operations comprising:

monitoring a wireless transmission by a source access node;

detecting a pattern of frame configurations in the wireless transmission; and decoding a data string encoded as the pattern of frame configurations;

wherein the pattern of frame configurations comprises a plurality of frame configurations, each of the plurality of frame configurations comprising a sequence of uplink and downlink subframes, and wherein decoding the data is performed based on a mapping of each of the plurality of frame configurations with a corresponding data bit of the data string.

17. The processing node of claim 16, wherein the wireless transmission comprises a system information message broadcast by the source access node.

18. The processing node of claim 16, wherein the wireless transmission comprises a communication between the source access node and a wireless device communicatively coupled to the source access node.

* * * * *